United States Patent
Lee et al.

(10) Patent No.: US 10,360,595 B2
(45) Date of Patent: Jul. 23, 2019

(54) ADVERTISING SYSTEM AND METHOD USING IN-APP ADVERTISEMENT MODULE

(71) Applicant: Buzzvil Co., Ltd., Seoul (KR)

(72) Inventors: Young Ho Lee, Seoul (KR); Gwan Woo Lee, Seoul (KR)

(73) Assignee: BUZZVIL CO., LTD., Seoul (KR)

( * ) Notice: Subject to any disclaimer, the term of this patent is extended or adjusted under 35 U.S.C. 154(b) by 358 days.

(21) Appl. No.: 14/119,675

(22) PCT Filed: Oct. 30, 2013

(86) PCT No.: PCT/KR2013/009746
§ 371 (c)(1),
(2) Date: Nov. 22, 2013

(87) PCT Pub. No.: WO2014/178496
PCT Pub. Date: Nov. 6, 2014

(65) Prior Publication Data
US 2015/0120458 A1    Apr. 30, 2015

(30) Foreign Application Priority Data

Apr. 30, 2013  (KR) .......................... 10-2013-0048796

(51) Int. Cl.
*G06Q 30/02*      (2012.01)
(52) U.S. Cl.
CPC ..... *G06Q 30/0262* (2013.01); *G06Q 30/0208* (2013.01); *G06Q 30/0209* (2013.01); *G06Q 30/0267* (2013.01)
(58) Field of Classification Search
None
See application file for complete search history.

(56) References Cited

U.S. PATENT DOCUMENTS

| | | | |
|---|---|---|---|
| 8,417,570 B2 * | 4/2013 | Thielke | G06Q 30/0267 705/14.42 |
| 2006/0270478 A1 * | 11/2006 | Barhydt | G06Q 20/06 463/41 |
| 2013/0111408 A1 * | 5/2013 | Berus | G06F 17/30873 715/835 |

(Continued)

FOREIGN PATENT DOCUMENTS

| KR | 10-2012-0000318 | 1/2013 |
|---|---|---|
| KR | 10-2013-0021035 | 3/2013 |

OTHER PUBLICATIONS

Frank Teoh; A Method and System for Rendering Mobile Billboards Powered by a Content Provider; Publication Date: Mar. 18, 2013 (Year: 2013).*

*Primary Examiner* — Sam Refai
*Assistant Examiner* — Rashida R Shorter
(74) *Attorney, Agent, or Firm* — Heedong Chae; Lucem, PC

(57) ABSTRACT

The present invention relates to an advertising system and method using an in-App advertisement module, which is capable of displaying an advertisement on a lock screen through an advertisement module which is inserted in one or more application and is installed in parallel to the applications and distributing saved rewards to the applications according to a user input through the lock screen on which the advertisement is displayed, thereby allowing the saved rewards to be used as points.

22 Claims, 15 Drawing Sheets

(56) References Cited

U.S. PATENT DOCUMENTS

| | | | | |
|---|---|---|---|---|
| 2014/0019253 A1* | 1/2014 | Ricasata | ............ | G06Q 30/0241 |
| | | | | 705/14.64 |
| 2014/0157199 A1* | 6/2014 | Kahler | ............... | G06Q 30/0267 |
| | | | | 715/833 |
| 2014/0222568 A1* | 8/2014 | Weitzman | .......... | G06Q 30/0261 |
| | | | | 705/14.57 |
| 2014/0297417 A1* | 10/2014 | Cusack | ................. | G06Q 30/02 |
| | | | | 705/14.61 |
| 2016/0044091 A1* | 2/2016 | Doumet | ................. | H04L 67/10 |
| | | | | 715/745 |

\* cited by examiner (a)

(b)

(a)

(b)

(c)

(a)

(b)

(a)

(b)

(c)

ADVERTISING SYSTEM AND METHOD USING IN-APP ADVERTISEMENT MODULE

CROSS-REFERENCE TO RELATED APPLICATION

This application claims the benefit of Korean Application No. 10-2013-0048796, filed on Apr. 30, 2013, with the Korean Intellectual Property Office, the disclosure of which is incorporated herein by reference.

BACKGROUND OF THE INVENTION

Field of the Invention

The present invention relates to an advertising system and method using an in-App advertisement module and more particularly, to an advertising system and method using an in-App advertisement module, which is capable of displaying an advertisement on a lock screen through an advertisement module which is inserted in one or more application and is installed in parallel to the applications and distributing saved rewards to the applications according to a user input through the lock screen on which the advertisement is displayed, thereby allowing the saved rewards to be used as points.

Description of the Related Art

With the development of smart phones, a variety of advertisement (Ad) service models using Ad applications is emerging. In addition, Ad service models for providing rewards to users who watched Ads in order to induce active Ad watching of users are being spotlighted.

Most of such Ad service models concentrate on functions of Ad provision and reward saving through Ad applications installed in a user terminal, and allow rewards saved according to Ad watching to be used to purchase goods off-line.

However, such Ad service models are subordinate to Ad applications and allow rewards acquired by watching of Ads provided by the Ad applications to be used to purchase only goods provided by the Ad applications.

Accordingly, since such Ad applications provide only consistent Ads, which may make users easily bored and avoiding from using them, advertisers prefer a scheme of displaying Ads in the form of a banner in applications in agreement with developers of applications having high rank in the application popularity.

However, for Ads using such Ad applications or applications having a high popularity rank, since the Ads are sensitive to fashion due to the nature of applications and a period of preference of users for the applications is generally short, the popularity of the applications tends to be frequently varied.

Accordingly, while the advertisers proceed with Ads in agreement with developers of the Ad applications or applications having a high popularity rank, if Ad effects decrease with decrease in the number of users, the advertisers may proceed with the Ads in another agreement with developers of applications or Ad applications having a high popularity rank according to variation of the popularity rank, which may be a troublesome work and may result in cost loss due to additional Ad proceeding.

In addition, if users watched Ads through the Ad applications or popular applications, rewards paid to the users are subordinate to the applications provided the Ads, which may result in extreme limitation on a range of use.

In addition, when the advertisers proceed with Ads through the applications, there is an inconvenience in use of the applications due to the Ads provided in the form of a banner or pop-up in the applications. In particular, for a game application, this inconvenience is more aggravated since the Ads interfere in game play.

Accordingly, there is a need for an improved Ad service model which is capable of satisfying both of advertisers and users by efficiently proceeding with Ads using applications and extending a range of use of rewards acquired according to the Ads.

RELATED TECHNICAL DOCUMENT

Patent Document (Patent Document 1) Korean Patent Registration No. 101102852

SUMMARY OF THE INVENTION

Accordingly, it is an object of the present invention to provide an Ad system and method using an in-App advertisement module which is capable of displaying Ads on a lock screen using Ad modules respectively subordinate to a plurality of different applications to prevent the Ads from interfering in use of the applications and prevent an Ad subordinate to a specific application from being displayed.

It is another object of the present invention to provide an Ad system and method using an in-App advertisement module which is capable of distributing rewards generated according to Ad watching to applications desired by a user to extend a range of use of rewards for goods provided by each of the applications.

It is another object of the present invention to provide an Ad system and method using an in-App advertisement module which is capable of identifying applications in which Ad modules are installed and displaying Ads associated with the applications on a lock screen, thereby inducing application developers to take an active part as advertisers, ensuring that rewards of users can be used in a wide range.

It is another object of the present invention to provide an Ad system and method using an in-App advertisement module which is capable of increasing Ad effects for applications by setting reward generation conditions as user inputs related to not only watching of Ads displayed on a lock screen but also application installation using Ad modules.

To achieve the above objects, according to an aspect of the invention, there is provided an advertising (Ad) system using an in-App advertisement module for displaying advertisements provided by an Ad server on a lock screen of a user terminal, including: one or more applications installed in the user terminal; an Ad module which is inserted in each of the applications, is installed in parallel to each application, and is configured to display externally-received Ad information on the lock screen, detect event information generated according to a user input through the user terminal, generate rewards if the detected event information satisfies reward generation conditions set in association with the Ad information, and transmit the generated rewards to the Ad server; and the Ad server configured to provide the Ad information for the Ad module, save the rewards received from the Ad module in association with the user terminal and transmit the saved rewards so that the saved rewards can be used in at least one of the applications.

The reward generation conditions may include event information set for at least one selected from a group consisting of lock state release, input to a user interface inserted in the Ad information, access to an address linked to the Ad information through the use input, and installation of an application corresponding to the Ad information through the user input.

If a plurality of applications in which the Ad modules are inserted is installed in the user terminal, the Ad modules may be integrated into the first-installed Ad module and identification (ID) information of a stored application may be stored in an Ad module inserted in each application, and the Ad module may add or delete the ID information of the application according to addition or deletion of the application.

The Ad module may transmit ID information of the latest-executed application in interlocking with execution of the application, and the Ad server may transmit saved rewards so that the saved rewards can be used in the latest-executed application based on the ID information.

The Ad module may provide the ID information of the application for the Ad server and the Ad server may provide Ad information based on the application ID information.

The reward generation conditions are differently set depending on the Ad information.

The Ad server may distribute and transmit the saved rewards at a ratio set for each application.

The Ad server may vary the set ratio automatically based on the number of applications installed in the user terminal.

The Ad server may vary the set ratio according to a user input received from the user terminal.

The Ad server may transmit the saved rewards to a server corresponding to each application and register the saved rewards in the server so that the saved rewards can be used to purchase items or goods.

The Ad server may exchange rewards assigned for each application for points according to an exchange rate set for each application and register the points in the server corresponding to each application in association with user information of the user terminal.

The application may provide one or more items which can be purchased with the rewards.

The Ad module may be activated based on a user input through the user terminal and display the Ad information on the lock screen.

The Ad module may display multiple Ad information received from the Ad server on the lock screen at set intervals According to another aspect of the invention, there is provided an advertising (Ad) method using an in-App advertisement module for providing Ads for a user terminal in communication of an Ad module with an Ad server, the Ad module being inserted in one or more applications installed in the user terminal and being installed in parallel to each of the applications, including: a first step where the Ad module requests the Ad server to provide Ad information; a second step where the Ad module displays the Ad information received from the Ad server on a lock screen of the user terminal; a third step where the Ad module detects event information generated according to a user input through the user terminal and compares the event information with reward generation conditions set to correspond to the Ad information; a fourth step where the Ad module generates rewards based on a result of the comparison of the third step and transmits the generated rewards to the Ad server; and a fifth step where the Ad server saves the rewards received from the Ad module to correspond to the user terminal and transmits the saved rewards so that the saved rewards can be used in at least one of the applications.

The first step may include: by the Ad module, transmitting stored identification (ID) information of each of the applications to the Ad server, and the second step may include: receiving Ad information based on the ID information of each of the applications from the Ad server.

The first step may include: by the Ad module, transmitting ID information of the latest-executed application to the Ad server, and the fifth step may include: by the Ad server, transmitting the saved rewards so that the saved rewards can be used in an application corresponding to the ID information received from the Ad module.

The fifth step may include: by the Ad server, distributing and transmitting the saved rewards at a ratio set for each of the applications so that the saved rewards can be used in each of the applications.

The fifth step may include: by the Ad server, automatically varying the set ratio based on the number of applications installed in the user terminal.

The fifth step may include: by the Ad server, receiving a user input provided from the user terminal and varying the set ratio according to the received user input.

The fifth step may include: by the Ad server, transmitting the saved rewards to a server corresponding to each of the applications and registering the saved rewards so that the saved rewards can be used to purchase items or goods.

The fifth step may include: exchanging rewards assigned to each of the applications for points according to an exchange rate set for each of the applications and registering the points in association with user information of the user terminal corresponding to each of the applications.

According to the present invention, an Ad module installed in parallel to one or more applications in a user terminal can display Ads on a lock screen without interfering in use of applications by a user. If a plurality of applications is installed, even when one of the applications is deleted, Ads can be consistently provided. In addition, rewards generated by an Ad module can be distributed for each of the plurality of applications, thereby extending a range of use to the plurality of applications without limiting the range of use to one application, which can result in satisfaction of both of users and advertisers.

In addition, according to the present invention, since an advertiser can directly inserts an Ad module in his/her application and provide his/her related Ad information for an Ad server, as the frequency of installation of his/her application by users becomes high, his/her related Ad information can be intensively displayed on the lock screen of the user terminal, which can lead to increase in Ad effects. With this configuration, the present invention can actively induce the advertiser to insert the Ad module in his/her application.

In addition, according to the present invention, since the Ad module can consistently output the Ad information even when one of the applications is deleted, an advertiser can proceed with an advertisement stably if only Ad information is provided to the Ad server, without cling to preference of an application having a short cycle duration, In addition, if preference of a particular application becomes high, the advertiser can benefit from increase in the preference of the particular application without any separate intervention.

Furthermore, according to the present invention, reward generation conditions for Ad information can be configured in a variety of schemes such as installation of applications to induce substantial installation of applications, which can result in great improvement of Ad effects for the applications.

BRIEF DESCRIPTION OF THE DRAWINGS

The above and/or other aspects and advantages of the present invention will become apparent and more readily appreciated from the following description of the embodiments, taken in conjunction with the accompanying drawings of which.

DETAILED DESCRIPTION OF THE PREFERRED EMBODIMENT

An Ad system using an in-App Ad module according to an embodiment of the present invention will now be described in detail with reference to the drawings.

Figure 1:
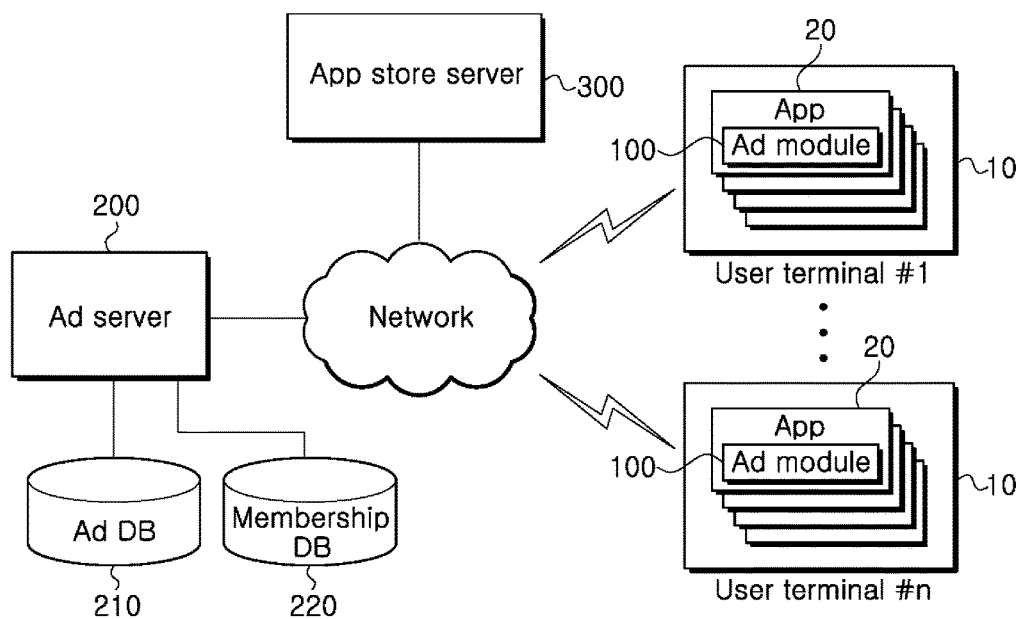
FIG. 1 is a configuration environment view of an Ad system using an in-App Ad module according to an embodiment of the present invention.

FIG. 1 is a configuration environment view of an Ad system using an in-App Ad module according to an embodiment of the present invention. Referring to FIG. 1, the Ad system using an in-App Ad module includes a plurality of user terminals 10, each of which is installed with a plurality of applications 20, an App store server 300 for providing the plurality of applications 20 for each user terminal 10 via a network, a membership database (DB) 220 for storing user information (membership information) of each user terminal 10, an Ad DB 210 for storing advertisements, and an Ad server 200 for providing the advertisements stored in the Ad DB 210 for each user terminal 10 via the network.

Examples of the user terminals 10 used herein may include smart phones, PDAs (Personal Digital Assistants) and the like.

The Ad system using an in-App Ad module may include an Ad module 100 which is inserted in an application 20 installed in each user terminal 10 and is installed along with the application 20. The Ad module 100 may be configured in an in-App form.

Figure 2:
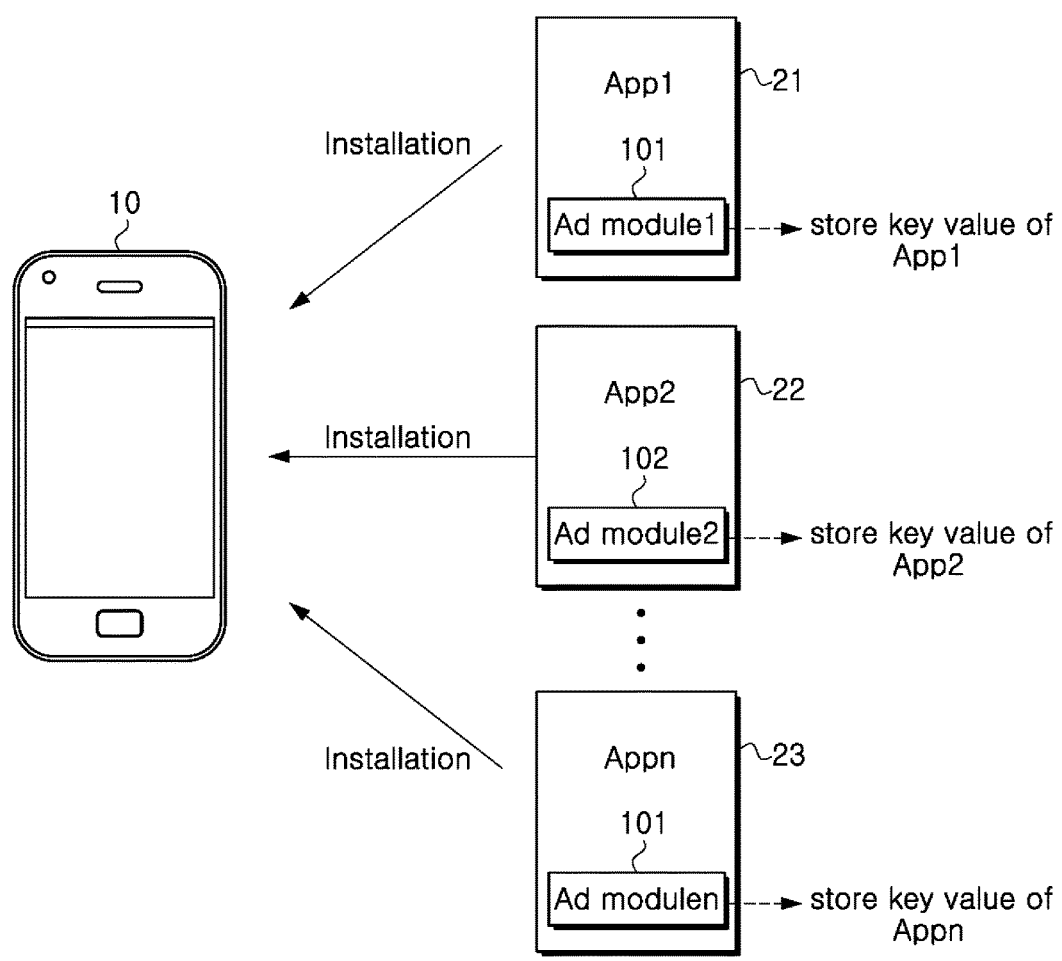
FIG. 2 is a configuration view showing installation of an Ad module constituting an Ad system using an in-App Ad module in a user terminal according to an embodiment of the present invention.

As shown in FIG. 2, when the Ad module 100 is inserted in different applications 21, 22 and 23 and the applications 21, 22 and 23 are installed in each user terminal 10, the Ad module 100 may be installed in the user terminal 10 along with the applications 21, 22 and 23.

In addition, as shown, when a plurality of Ad modules 101, 102 and 103 inserted in the plurality of different applications 21, 22 and 23 are installed in parallel, the plurality of Ad modules may be integrated into a single Ad module 100.

In this case, each Ad module 101, 102 and 103 may store identification (ID) information of the different applications and the single Ad module 100 may store application ID information on one or more of the different applications.

Figure 3:
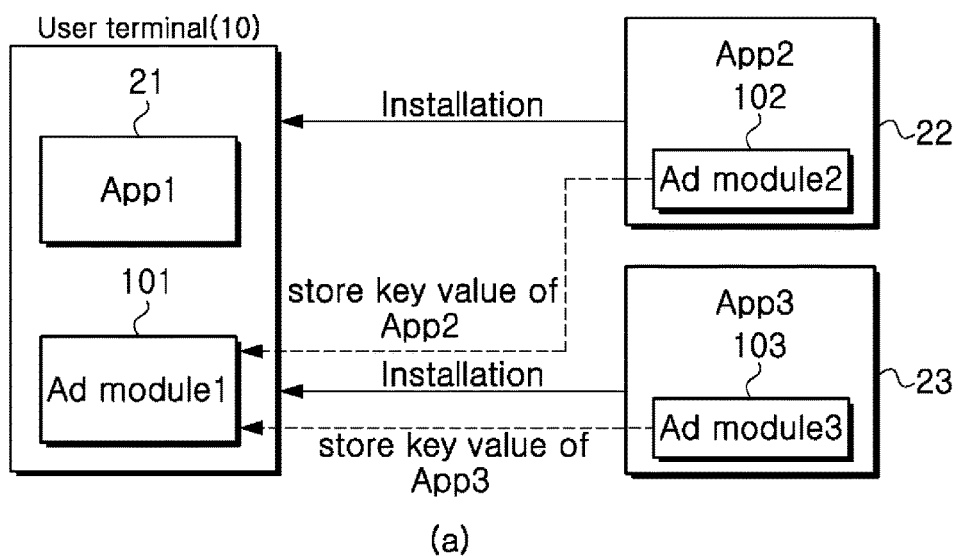
FIG. 3 is a configuration view showing Ad module integration of an Ad system using an in-App Ad module according to an embodiment of the present invention.
Figure 3:
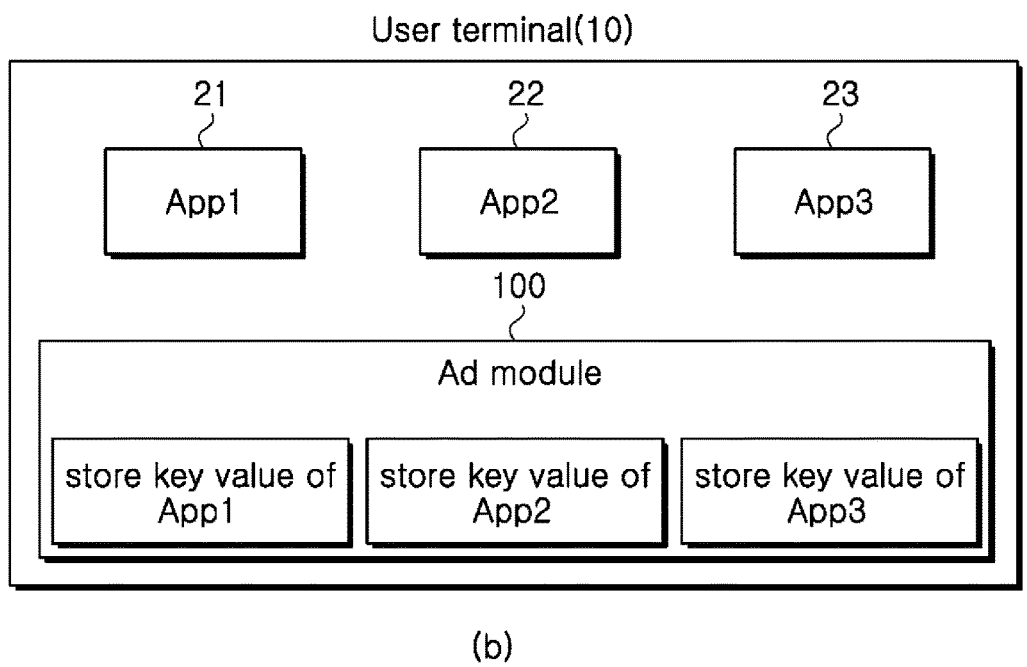

In more detail, as shown in FIG. 3A, if AD module1 101 first installed in the user terminal along with App1 21 exists, Ad module2 102 and Ad module3 103 respectively inserted in App2 22 and App3 23 installed later are not installed in parallel and ID values (key values) of App2 22 and App3 23 respectively stored in Ad module 2 and Ad module3 may be stored in Ad module1 101. At this time, Ad module2 102 and Ad module3 103 are overlapped with Ad module1 101 and the ID information of App2 22 and App3 23 can be stored in Ad module1 101.

Accordingly, Ad module1 101 stores the ID information of App1 to App3 21, 22 and 23 to be integrated into the single Ad module 100 as shown in FIG. 3B and the Ad module 100 communicates with the Ad server 200 to output Ad information received from the Ad server 200 on a lock screen of the user terminal 10.

Accordingly, the Ad module 100 can provide information for identifying an application installed in the user terminal 10 by transmitting one or more different information stored therein to the Ad server 200, and the Ad server 200 can determine the status of the application installed in the user terminal based on the one or more ID information received from the Ad module 100.

On the other hand, the Ad module 100 integrally installed in the user terminal can store the ID information on the one or more applications 21 and 22 as described above, and, as shown in FIG. 4A, the Ad module 100 can receive the Ad information from the Ad server 200 and output the received Ad information to a lock screen 30 of the user terminal 10.

Figure 4:
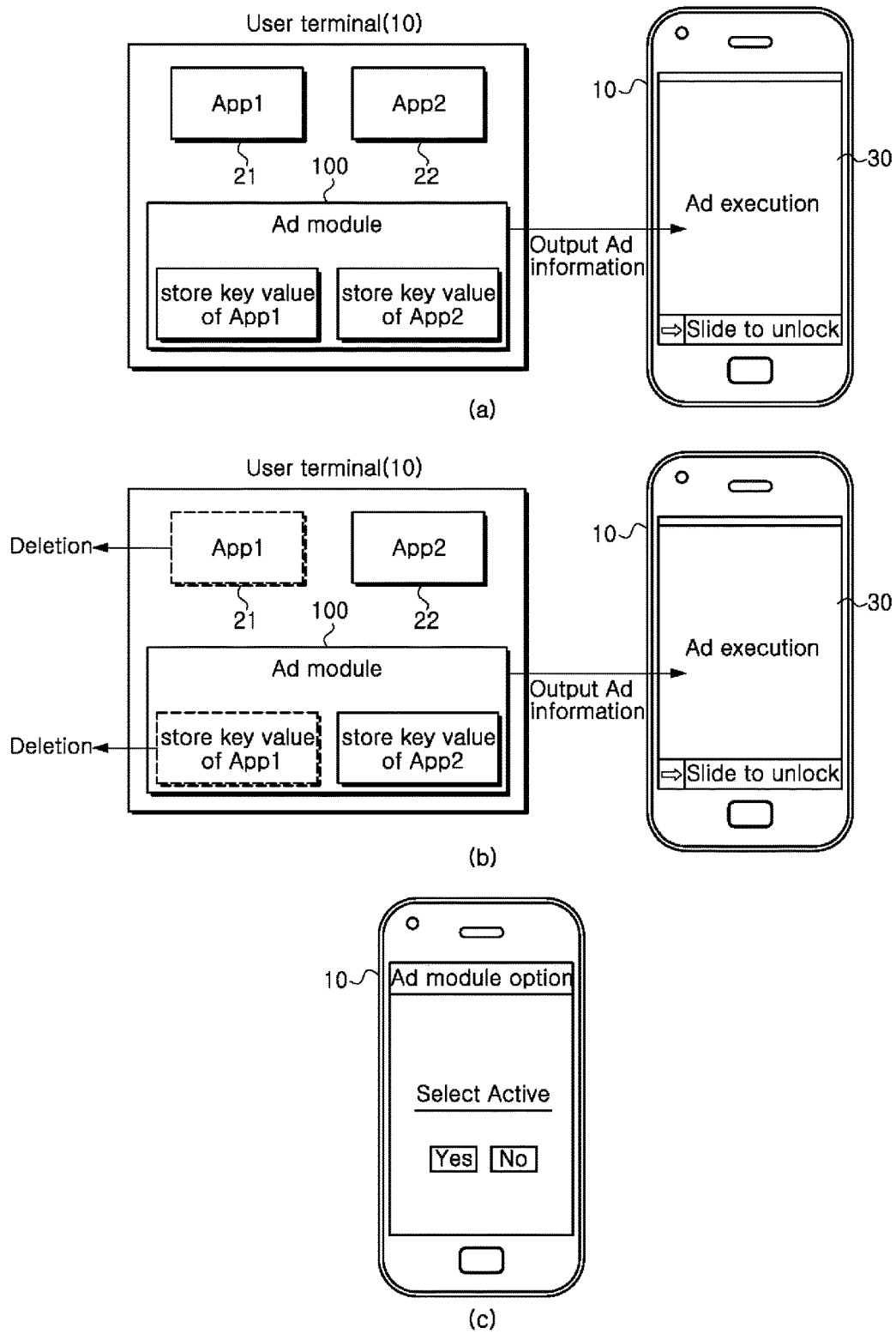
FIG. 4 is an operation configuration view of an Ad module depending on a change in state of an application according to an embodiment of the present invention.

At this time, as shown in FIG. 4B, if one 21 of the applications installed in the user terminal is deleted, the Ad module 100 can delete ID information corresponding to the deleted application 21 among the stored ID information.

Accordingly, the Ad module 100 can transmit the current stored one or more ID information to the Ad server 200 at a request for transmission of Ad information to the Ad server 200, and the Ad server 200 can determines the deleted application based on the ID information received from the Ad module 100.

In addition, the Ad module 100 can provide a user interface to allow a user to determine whether to activate the Ad module 100, as shown in FIG. 4C, in interlocking with the user terminal 10 in which a mobile operating system (OS) is installed, and can activate the Ad module selectively based on a user input received through the user terminal. Accordingly, if the user does not want the Ad information to be displayed on the lock screen, the Ad module is deactivated to prevent the Ad information from being displayed on the lock screen. At this time, the user interface to allow the user to determine whether to activate the Ad module 100 may be provided through the application in addition to the mobile OS installed in the user terminal.

Figure 5:
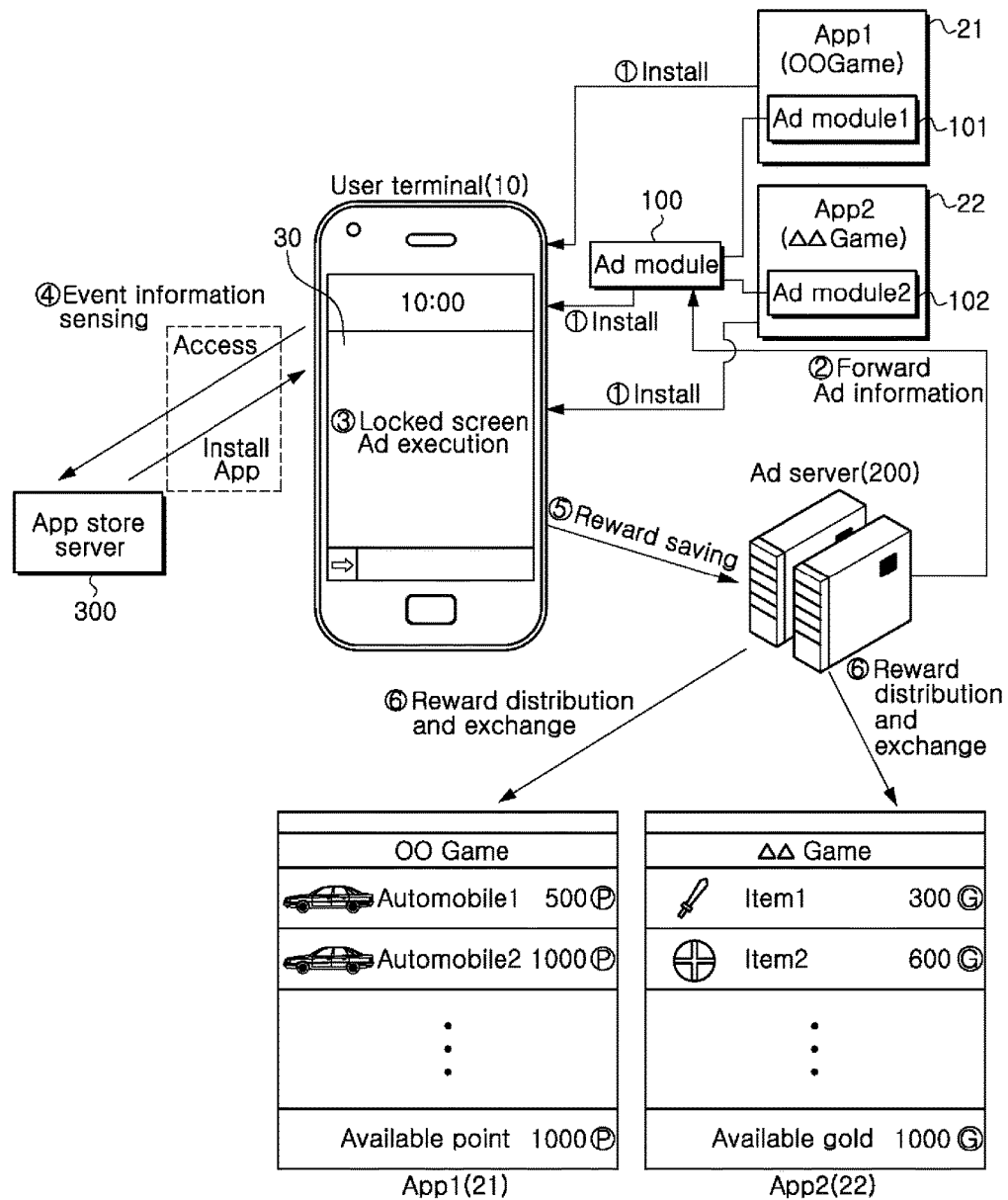
FIG. 5 is an operation configuration view of an Ad system using an in-App Ad module according to an embodiment of the present invention.

A detailed operation configuration of the Ad system using the Ad modules included in the application according to an embodiment of the present invention with the configuration described above will now be described with reference to FIG. 5. As shown, Ad module1 101 and Ad module2 102 respectively inserted in the applications 21 and 22 installed in the user terminal 10 are installed along with the applications and are integrated into the single Ad module 100 in the user terminal 10 (①). In addition, the Ad module 100 can be activated upon completion of the installation or activated according to a user input through the user terminal 10. At this time, if an application in which the Ad module is inserted is initially installed in the user terminal 10, the Ad module is installed together without being integrated with the application.

Accordingly, the activated Ad module 100 can receive Ad information from the Ad server 200 (②) and display the Ad information on the lock screen 30 of the user terminal 10 (③).

"Lock screen" 30 used herein will be described in detail below. The user terminal 10 is set to be in a locking state to prevent the user terminal 10 from malfunctioning due to persistent generation of an input through a touch screen, an external input button or the like irrespective of the intention of the user. Accordingly, the user terminal 10 displays the lock screen 30 on a display of the user terminal according to the locking state at initial driving and can use a desired function by releasing the locking only when a preset input corresponding to the release of the locking state.

The Ad module according to the present invention is preferably executed in iOS as an Apple's mobile OS, Android as a Google's mobile OS, or the like but is not limited thereto.

As a result, unlike existing Ad serve models proceeding with an advertisement in the form of a banner or pop-up on a screen provided by an application, thereby hindering use of the application, the Ad module does not hinder the use of the application by displaying the Ad information on the lock screen displayed on the display of the user terminal.

In particular, for a game application having a game screen on which a user input is generated as a whole, if Ad information is displayed on a portion of the game screen, hindrance to the progress of game due to erroneous input for the Ad information occurs frequently. However, the present invention provides no possibility of occurrence of erroneous input by displaying the Ad information on the lock screen without displaying the Ad information on an execution screen of the application and can provide more effective Ad information than a limitative Ad form such as a banner or a pop-up by displaying the Ad information on the lock screen.

Here, the Ad information may include image data, video data, flash data and the like to improve a static Ad form subordinate to a screen provided by an existing application, thereby providing a high-concentration level of advertisements.

In the meantime, the Ad module 100 can detect event information generated according to a user input through the user terminal 10 (④), compare the event information with a reward generation condition preset to correspond to the Ad information, generate a reward if the event information corresponding to the reward generation condition is detected, and transmit the generated reward to the Ad server 200 (⑤).

As used herein, the term "reward" refers to a kind of cyber money paid to users in association with Ad information, which can be used to use services provided by applications.

In addition, the reward generation condition may be set with a variety of event information based on user inputs including release of the lock state, input to the user interface inserted in the Ad information, access to an address linked to the Ad information through the use inputs, access to the App store server 300 through the Ad information for installation of an application corresponding to the Ad information, etc.

Thereafter, the Ad server 200 can save the reward provided from the Ad module 100 installed in the user terminal 10 and transmit the saved reward to a server corresponding to the application so that the saved reward can be used in at least one of the applications 21 and 22 installed in the user terminal 10 (⑥).

In the above-described procedure, the Ad module 100 can store the ID information on App1 21 and App2 22 and transmit it to the Ad server 200.

Accordingly, the Ad server 200 can identify App1 21 and App2 22 installed in the user terminal 10 based on the ID information received from the Ad module 100 and provide the saved reward so that the saved reward can be used in at least one of App1 21 and App2 22.

Figure 6:
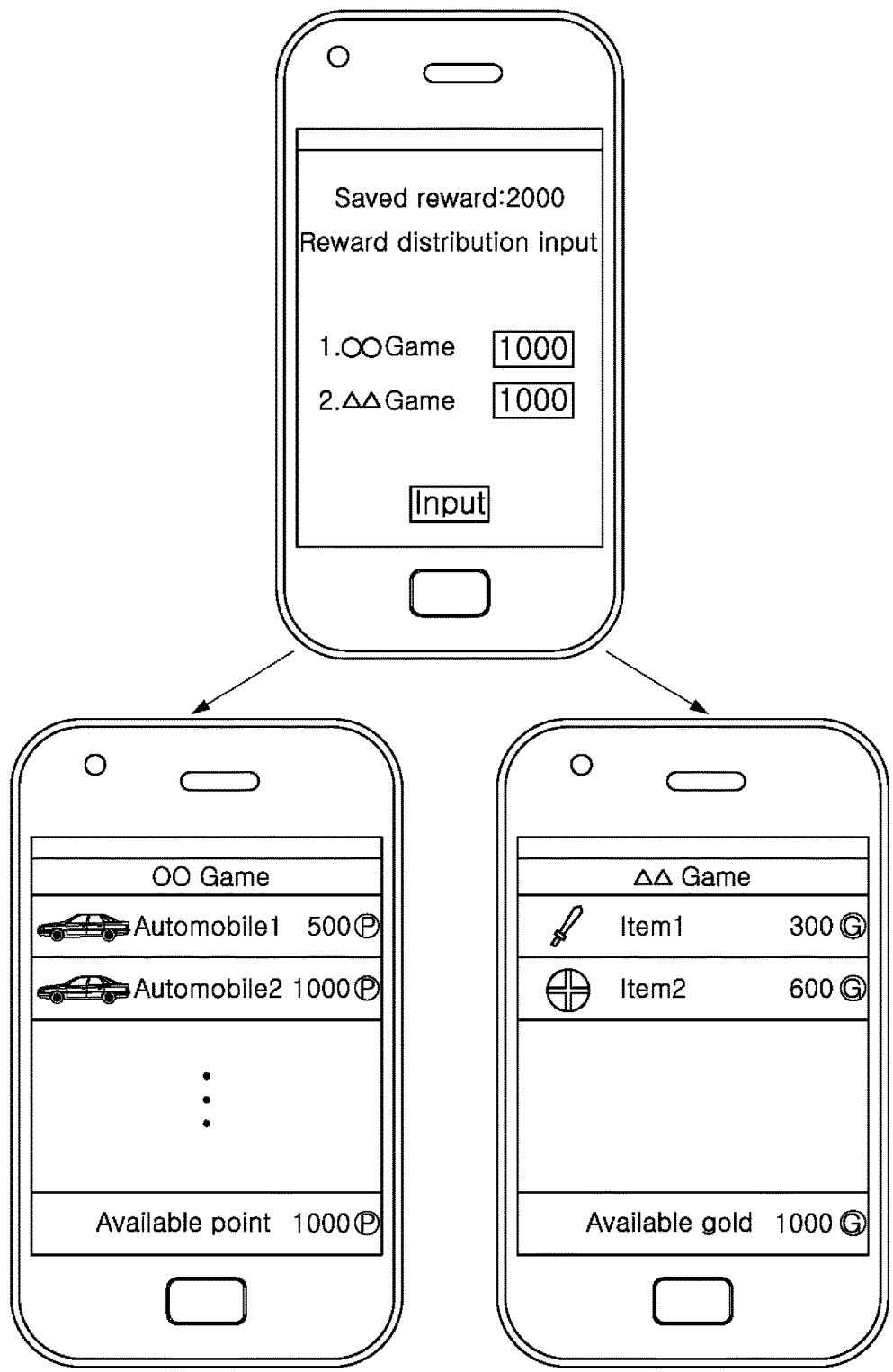
FIG. 6 is a configuration view showing application reward distribution, according to a user input, of an Ad system using an in-App Ad module according to an embodiment of the present invention.

As one example, as shown in FIG. 6, the Ad server 200 can provide information on the saved reward through a web site of the Ad server 200 and provide a setup interface for allocating the saved reward to a desired application through the web site according to a user input received from the user terminal 10 accessed the web site.

Accordingly, the Ad server 200 transmits the reward input for each application 21 and 22 to a server corresponding to each application 21 and 22 based on the user input through the setup interface so that the reward can be used in an application desired by the user.

In addition, the Ad server 200 can automatically distribute the saved rewards to each application 21 and 22 at a preset ration and transmit the distributed rewards to a server corresponding to each application, as will be described below.

In addition, the Ad server 200 can exchange the rewards, which are distributed for each of the applications 21 and 22 in which the Ad modules 101 and 102 are respectively inserted, for points corresponding to each application 21 and 22 and register and save the points in a server associated with each application 21 and 22.

At this time, it is obvious that the Ad server 200 can provide rewards distributed with no exchange to each application-related server where exchange is achieved or the rewards are used as points.

Accordingly, a user can use rewards saved through Ad information watching or specific input as points used for purchase of goods such as items provided by each application.

Accordingly, as shown, rewards saved through the single Ad module 100 into which Ad module1 101 and Ad module2 102 respectively inserted in game App1 21 and game App2 22 installed in the user terminal are integrated are distributed to the game applications 21 and 22 and are exchanged for points corresponding to game App1 21 and game App2 22 to purchase items provided by each game application 21 and 22. In addition, the saved rewards can be intensively allocated to one application desired by the user.

Figure 7:
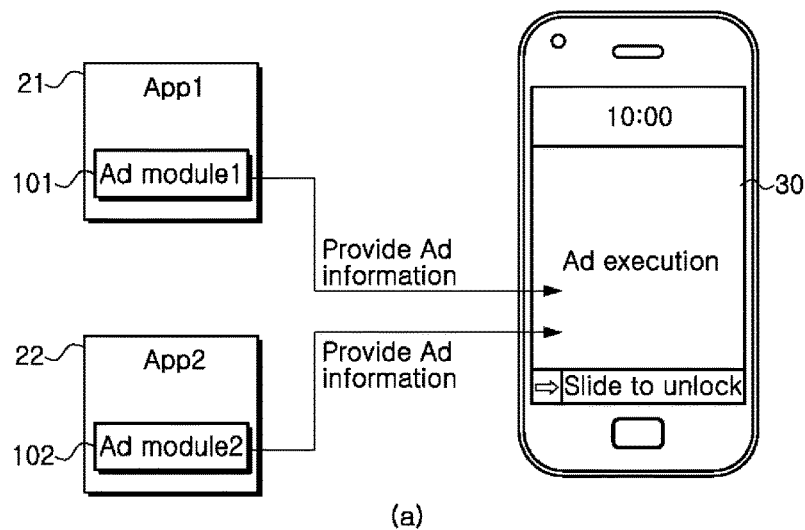
FIG. 7 is a configuration view showing parallel installation, execution and Ad output of an in-App Ad module according to another embodiment of the present invention.
Figure 7:
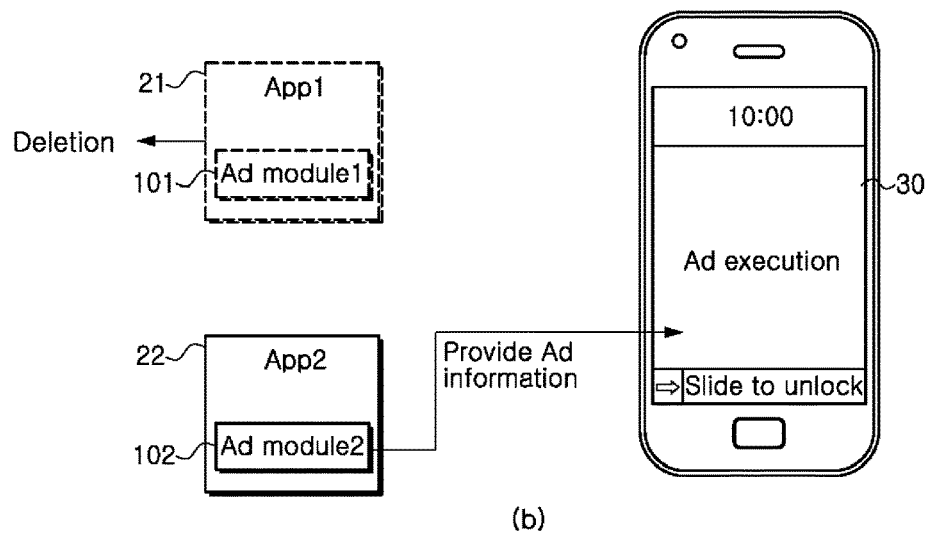
Figure 7:
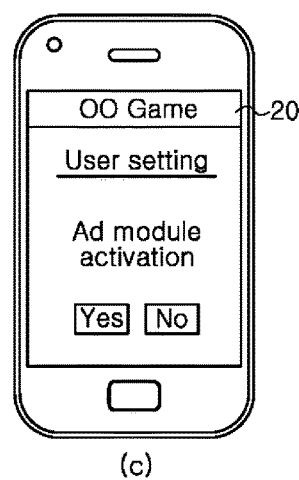

On the other hand, in addition to the above-described configuration, as shown in FIG. 7, if a plurality of Ad modules 101 and 102 inserted in different applications 21 and 22 are installed in parallel, these Ad modules may be individually installed in parallel without being integrated and a corresponding installed Ad module may be executed when each application is executed.

Referring to FIG. 7A in more detail, the applications 21 and 22 corresponding respectively to the Ad modules 101 and 102 are installed and an Ad module corresponding to an application executed in the user terminal can be executed to display an advertisement on the lock screen of the user terminal.

At this time, when each of the Ad modules 21 and 22 stores the ID information of a corresponding application and is activated with execution of the corresponding application, each of the Ad module can transmit the stored ID information to the Ad server 200. Accordingly, as will be described later, the Ad server 200 can transmit Ad information associated with the received ID information to the activated Ad module.

On the other hand, if App2 22 is executed to activate Ad module2 102 while Ad module1 101 is activated together App1 21 corresponding to Ad module1 101 to output Ad information in FIG. 7A, Ad module2 102 stops (deactivate) the execution of Ad module1 101 and can be activated to display the Ad information on the lock screen 30 of the user terminal.

At this time, each of the Ad modules can interlock with an application and an Ad module having the same ID information as the latest-executed application can be operated to display the Ad information on the lock screen.

Accordingly, Ad module2 102 can replace the ID information of App1 21 stored in Ad module1 101 with the ID information of App2 22 stored in Ad module 2 102, transmit the ID information of App2 22 to the Ad server 200, receives Ad information from the Ad server 200, and display the Ad information on the lock screen 30 of the user terminal.

Accordingly, while stopping Ad module1 101 to output the Ad information associated with App1 21, the activated Ad module2 102 can display the Ad information associated with App2 22 on the lock screen 30 of the user terminal.

In addition, as shown in FIG. 7B, the Ad modules 101 and 102 independently installed in parallel to correspond respectively to the applications 21 and 22 may be added and deleted in association with addition and deletion of the applications 21 and 22. Accordingly, as shown, if App1 21 is deleted, Ad module1 101 installed in parallel to App1 21 can be deleted together.

Even in this case, irrespective of the deletion of App1 and Ad module1, when App2 22 is executed, Ad module2 202 is executed to still display the Ad information on the lock screen 30 of the user terminal.

On the other hand, as shown in FIG. 7C, each application 20 can receive information on whether or not the Ad module 100 installed in parallel to the application 20 is activated, through a user input of the user terminal, and, based on this activation information, it is determined whether to execute the Ad module 100 and, based on this determination, the Ad information can be selectively displayed on the lock screen 30 of the user terminal.

In the configuration of FIG. 7, each Ad module can save rewards in the Ad server and the rewards saved in the Ad server can be distributed to applications, which can result in extension of a range of use of rewards.

According to the above-described configuration, the Ad modules are inserted in specific applications and are installed in parallel in the user terminal. However, the range of use of rewards generated by the Ad modules is not limited to the specific applications but the rewards may be used to purchase goods of different applications with Ad modules inserted therein. This may result in extension of the range of use of rewards by users.

In addition, although one of applications in which the Ad module is deleted, since an Ad module installed in another application can consistently display Ad information on the lock screen, an advertiser can proceed with an advertisement stably if only Ad information is provided to the Ad server, without cling to preference of an application having a short cycle duration. In addition, if preference of a particular application in which an Ad module is inserted becomes high, the advertiser can benefit from increase in the preference of the particular application without any separate intervention.

Figure 8:
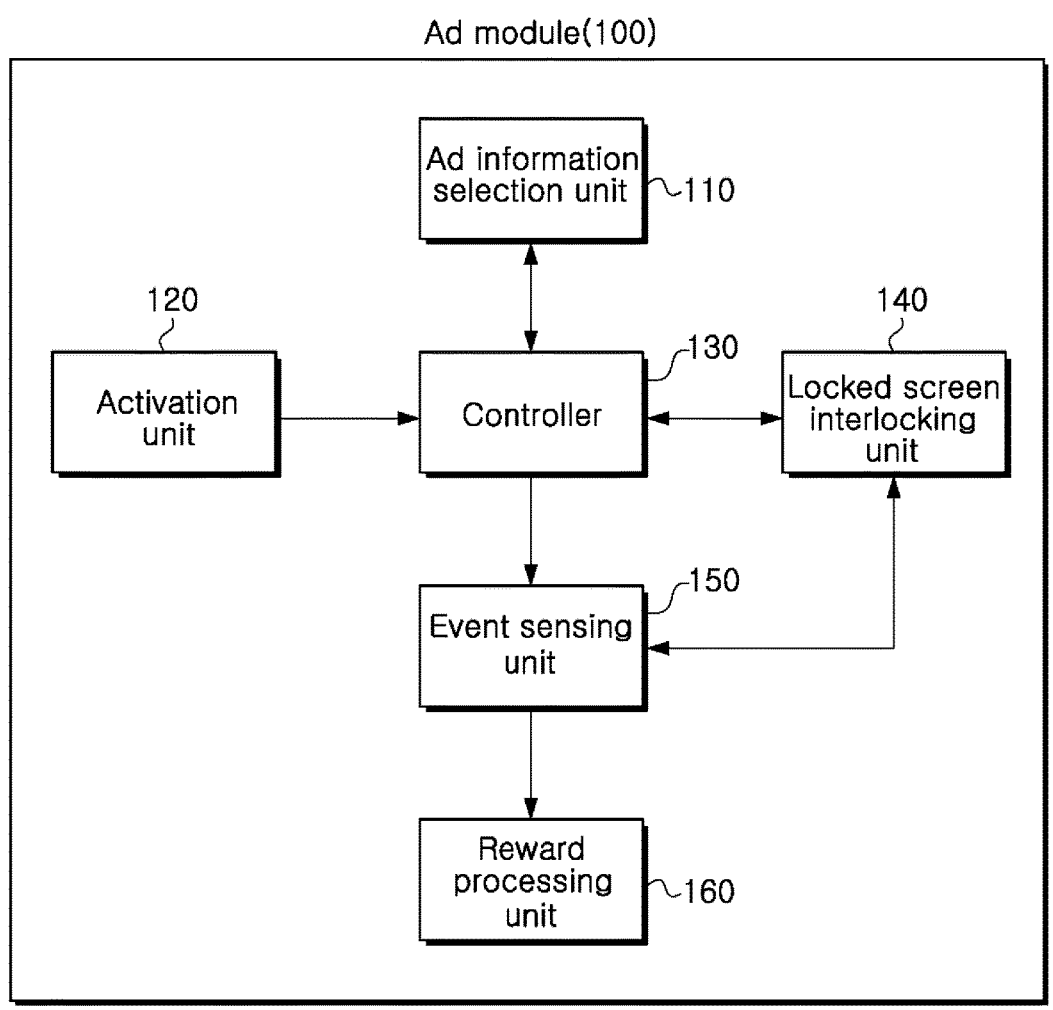
FIG. 8 is a detailed configuration view of an Ad module according to an embodiment of the present invention.

FIG. 8 is a detailed configuration view of the above-described Ad module 100. As shown, the Ad module 100 may include an Ad information collection unit 110, an activation unit 120, a lock screen interlocking unit 140, an event detecting unit 150, a reward processing unit 160 and a controller 130.

First, the Ad information collection unit 110 can receive Ad information in communication with the Ad server 200 and provide the Ad information to the controller 130.

The controller 130 can provide the Ad information can transmit the Ad information received from the Ad information collection unit 110 to the lock screen interlocking unit 140, and the lock screen interlocking unit 140 can detect a locking state of the user terminal 10 and display the Ad information on the lock screen based on the locking state.

The activation unit 120 can receive a user input through the user terminal 10, receive selection information on activation or deactivation of the Ad module 100, and transmit the selection information to the controller 130.

The controller 130 can control the Ad information collection unit 110 based on the selection information to determine whether or not the Ad information is received.

The event detecting unit 150 can detect event information generated according to the user input through the user terminal, receive the preset reward generation conditions corresponding to the Ad information displayed on the lock screen from the controller 130, compare the reward generation conditions with the event information, generate result information if the event information satisfies the reward generation conditions, and transmit the result information to the reward processing unit 160.

At this time, the reward generation conditions may be stored in the Ad information and different reward generation conditions may be set depending on the type of Ad information.

Figure 9:
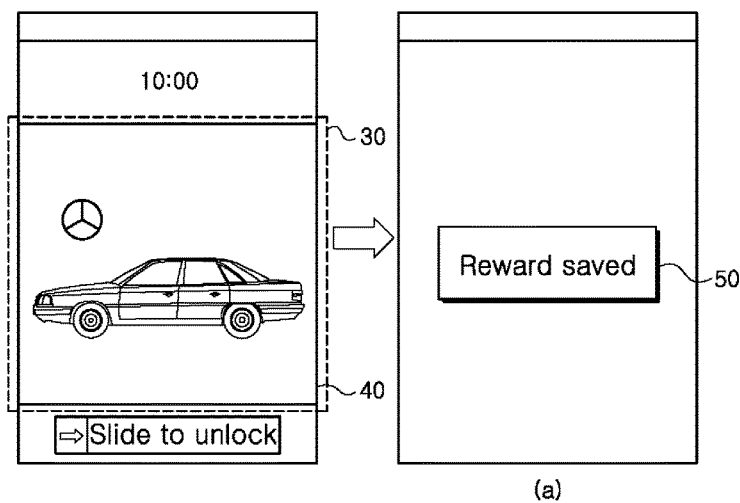
FIG. 9 is a configuration view showing event detection depending on a user input through Ad information displayed on a lock screen of an Ad module according to an embodiment of the present invention.
Figure 9:
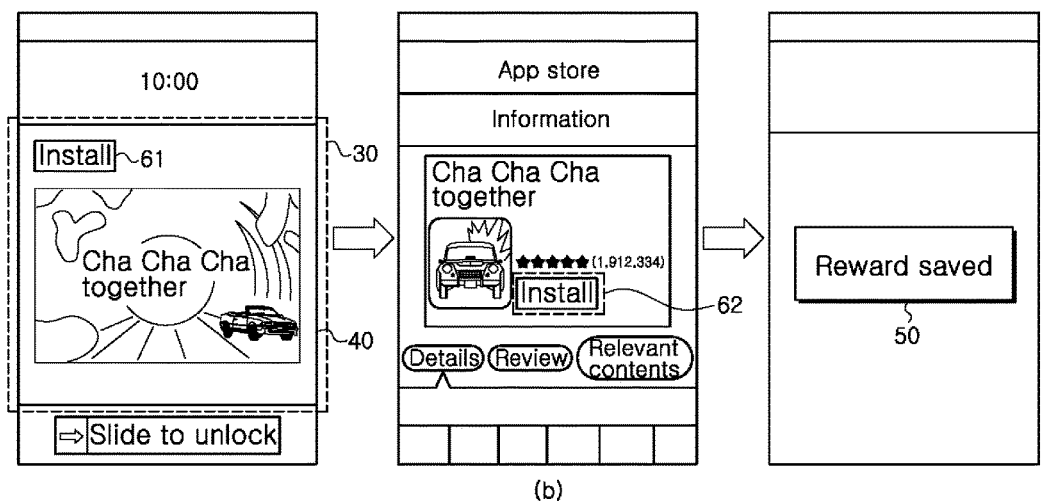

A configuration of the event detecting unit 150 as described above will now be described in more detail with reference to FIG. 9. The event detecting unit 150 can receive the reward generation conditions corresponding to the Ad information 40 from the controller 130 when the Ad information 40 is displayed on the lock screen 30, detect an event generated according to a user input, generate result information based on whether or not the detected event matches with the reward generation conditions, and transmit the result information to the reward processing unit 160.

As one example, as shown in FIG. 9A, if the reward generation conditions corresponding to the Ad information 40 displayed on the lock screen 30 is locked state release 31, the event detecting unit 150 can detect an event for the locked state release 31 according to the user input and transmit result information 50 to the reward processing unit 160 if the locked state is released.

In addition, as shown in FIG. 9B, if the reward generation conditions corresponding to the Ad information 40 displayed on the lock screen 30 are installation of an application corresponding to the Ad information, the event detecting unit 150 can detect an access to the App store server 300 through a user input for the user interface 51 inserted in the Ad information, detect application installation 62 corresponding to the As information 40 from the App store server 300, and transmit result information to the reward processing unit 160 upon completion of the installation. At this time, the event detecting unit 150 may not generate result information if the installation is not completed after the access to the App store server 300.

If the reward generation conditions are a user input for the user interface 51 inserted in the Ad information, the event detecting unit 150 can generate result information only with an input for the user interface inserted in the Ad information. If the reward generation conditions are an access to an address linked to the Ad information, the event detecting unit 150 can generate result information only with an address access through the Ad information.

The reward generation conditions may include event information on actions such as bookmark addition, membership joining, recommendation function supported by SNS (Social Networking Service), secondary viral advertisement and so on, which can be obtained with an access to a Web page linked to the Ad information according to CPA (Cost Per Action), event information on actions of purchasing real goods with an access to a Web page according to CPS (Cost Per SALE), and event information on membership joining through the Ad information according to CPL (Cost Per Lead). Such reward generation conditions may be differently set for different Ad information, as described above.

The reward processing unit 160 can receive the result information, generate rewards based on the result information, and transmit the generated rewards to the Ad server 200 which then accumulate the rewards.

The event detecting unit 150 can set rewards having different values depending on different reward generation conditions and provide the set rewards as result information, and the reward processing unit 160 can generate rewards based on the reward values included in the result information. In addition, the reward processing unit 160 can generate rewards having different values for different Ad information in association with the controller 130.

Based on the above-described configuration, the Ad module can selectively receive advertisements associated with applications installed in the user terminal, an embodiment of which will be described in detail below with reference to FIG. 10.

Figure 10:
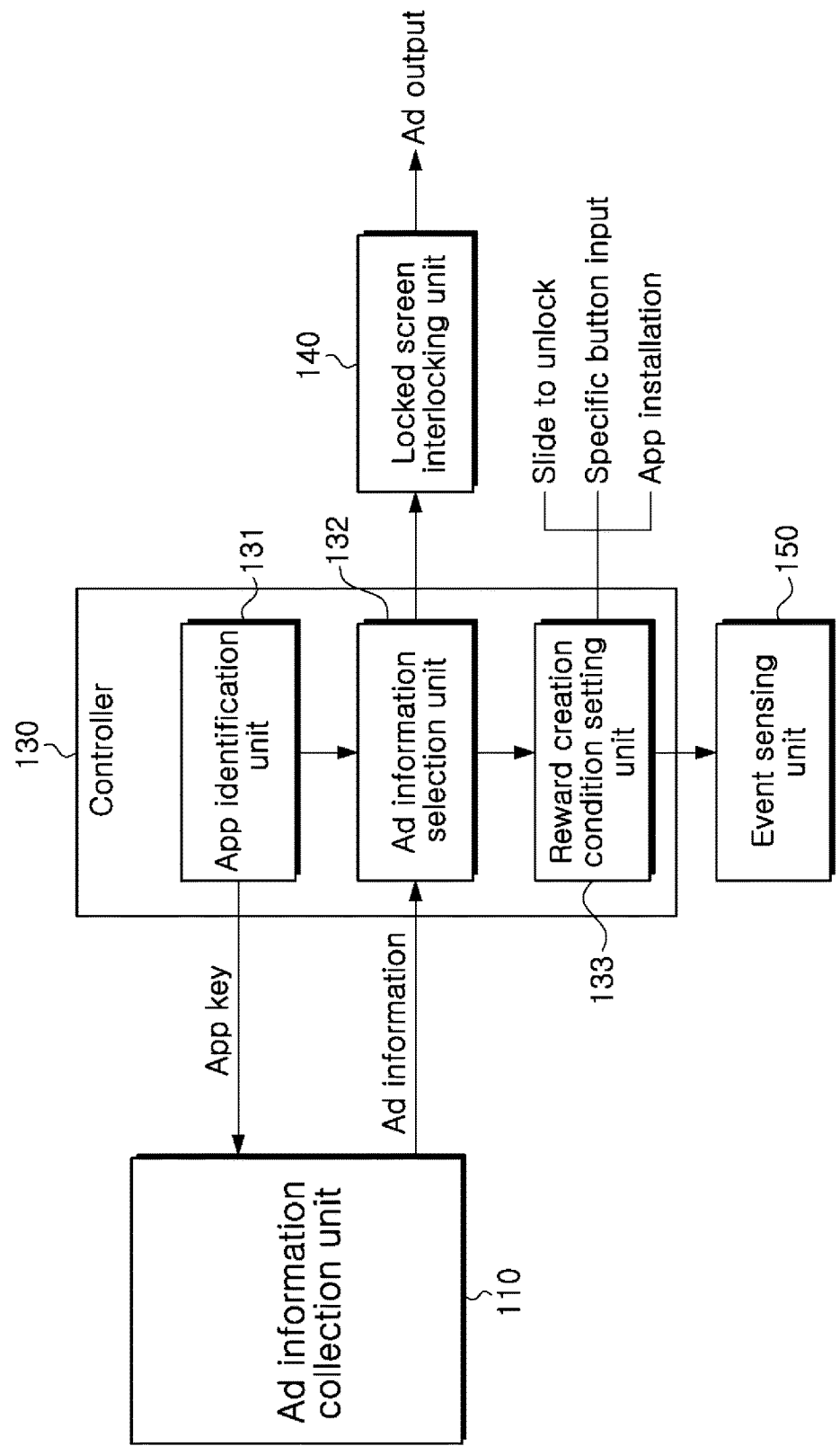
FIG. 10 is a configuration view showing selective Ad reception of an Ad module and Ad information reward generation conditions according to an embodiment of the present invention.

Referring to FIG. 10, the controller 130 may include an App identification unit 131, an Ad information selection unit 132 and a reward creation condition setting unit 133. The App identification unit 131 can store ID information on one or more applications installed in the user terminal 10 and transmit the stored ID information to the Ad information collection unit 110.

Then, the Ad information collection unit 110 can transmit the ID information to the Ad server 200. The Ad server 200 can provide advertisements associated with applications installed in the user terminal based on the ID information. As one example, the Ad server 200 can transmit Ad information provided by an advertiser, for example, a developer of an application installed in the user terminal 10, to the Ad information collection unit 110.

In addition to the above-described configuration, the Ad information selection unit 132 can select one of multiple Ad information provided by the Ad information collection unit 110 and transmit the selected Ad information to a lock screen interlocking unit 140. The lock screen interlocking unit 140 can display the selected Ad information on the lock screen.

The Ad information selection unit 132 can transmit multiple Ad information to the lock screen interlocking unit 140 one by one at preset intervals and display the individual Ad information sequentially on the lock screen.

Further, the Ad information selection 132 can transmit the selected Ad information to the reward generation condition setting unit 133. The reward generation condition setting unit 133 can extract the reward generation conditions included in the Ad information and transmit the extracted reward generation conditions to the event detecting unit 150.

Then, the event detecting unit 150 can compare the reward generation conditions with user input-based event information and generate result information based on a result of the comparison, as described above.

Figure 11:
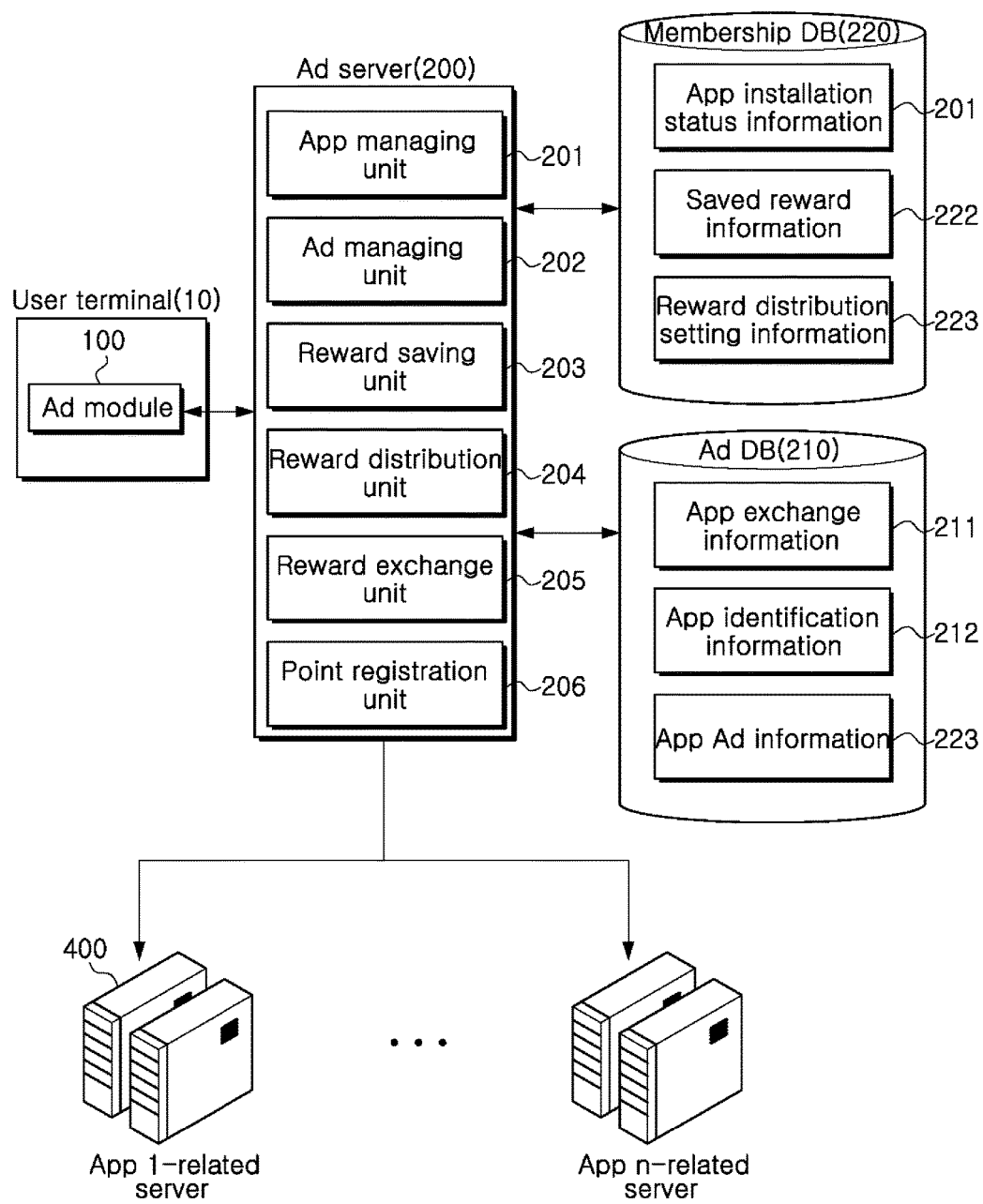
FIG. 11 is a detailed configuration view of an Ad server constituting an Ad system using an in-App Ad module according to an embodiment of the present invention.

FIG. 11 shows a detailed configuration of the Ad server 200 according to the embodiment of the present invention. As shown, the Ad server 200 may include an App managing unit 201, an Ad managing unit 202, a reward saving unit 203, a reward distribution unit 204, a reward exchange unit 205, a point registration unit 206, a membership DB 220 for storing membership information related to the user terminal, and an Ad DB 210 for storing Ad-related information.

First, the App managing unit 201 can determine a status of installation of an application in which an Ad module is inserted among applications installed in the user terminal 10 in communication with the user terminal 10. Specifically, the Ad module 100 installed in parallel to one or more different applications can transmit stored one or more application ID information to the App managing unit 201, and then, the App managing unit 201 can identify an application in which an Ad module is inserted, based on the one or more application ID information transmitted from the Ad module 100 in correspondence to the user terminal. Accordingly, the App managing unit 201 can store the one or more application ID information, as application installation status information 221, in membership information of the membership DB 220 corresponding to the user terminal 10.

The Ad managing unit 202 can transmit the Ad information stored in the Ad DB 210 to the Ad module 100 installed in parallel to the application in the user terminal. At this time, application ID information 212 and multiple Ad information 213 corresponding to each application in which the Ad module 100 is inserted may be stored in the Ad DB 210. Then, the Ad managing unit 202 can compare the application installation status information 221 of the membership DB 220 with the application ID information to identify the application installed in the user terminal and transmit the Ad information corresponding to each application to the Ad module 100 installed in the user terminal 10. At this time, the Ad information may be stored in the Ad DB 210, irrespective of the application, in which case it is obvious that the Ad managing unit 202 can randomly select and transmit the Ad information to the Ad module 100.

Accordingly, since an advertiser can directly insert an Ad module in his/her application and provide his/her related Ad information for the Ad server, as the frequency of installation of his/her application by users becomes high, his/her related Ad information can be intensively displayed on the lock screen of the user terminal, which can lead to increase in Ad effects. With this configuration, the present invention can actively induce the advertiser to insert the Ad module in his/her application.

The reward saving unit 203 can save rewards generated by the Ad module and store accumulated reward information 222 in the membership information of the membership DB 220 corresponding to the user terminal 10, and the reward distribution unit 204 can transmit the saved rewards according to the accumulated reward information 222 to a server corresponding to an application desired by a user according to a user input through the user terminal, thereby allowing the user to use the rewards in the corresponding application.

In addition, the reward distribution unit 204 can distribute the saved rewards for each application according to the application installation status information 221.

Figure 12:
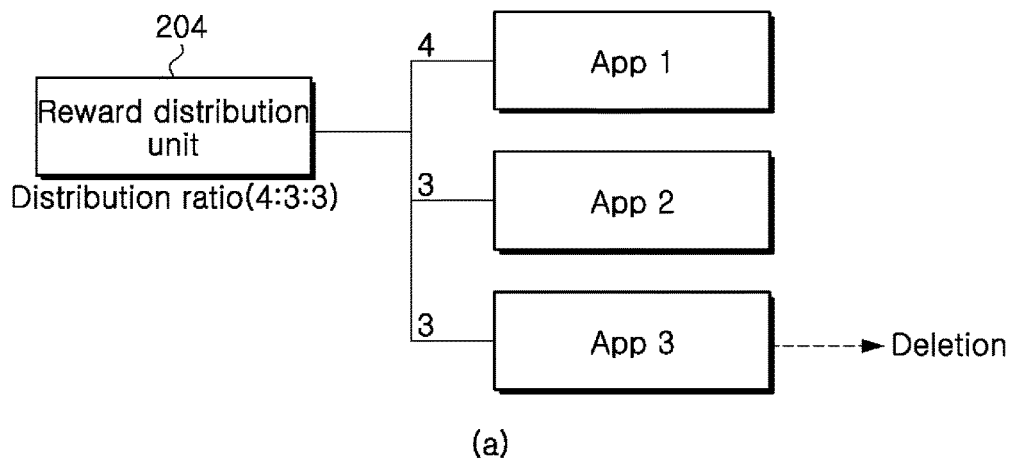
FIG. 12 is an operation configuration view showing reward distribution, according to a user input, of an Ad system using an in-App Ad module according to an embodiment of the present invention.
Figure 12:
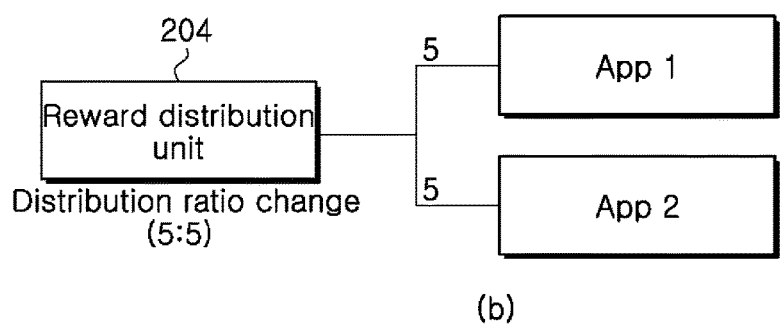
Figure 12:
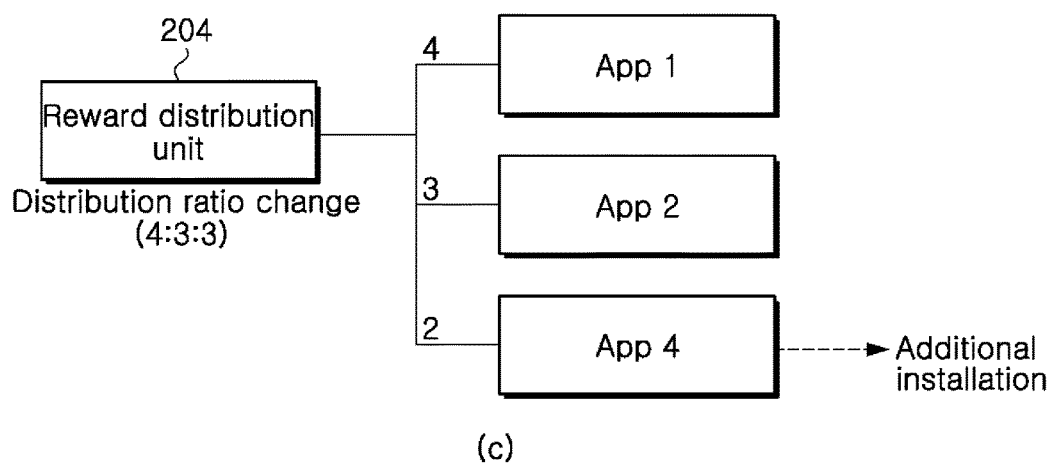

At this time, as shown in FIG. 12, the reward distribution unit 204 can distribute the saved rewards for each application in which each Ad module is inserted, at ratios set based on the number of applications installed in the user terminal according to the application installation status information 221.

As one example, as shown in FIG. 12A, the reward distribution unit 204 can set a high distribution ratio of the saved rewards for the first installed App1 and adjust the distribution ratio to a ratio set according to App2 and App3 installed thereafter, thereby distributing the saved rewards at a ratio of 4:3:3 (10 in total) for App1 to App3. In this case, the set ratio may be variably set along with installation of each application. As one example, the reward distribution unit 204 may set the distribution ratio to 10/10 according to the set ratio when App1 is installed in the user terminal, thereafter, set the distribution ratio for App1 to 5/10 according to the set ratio when App2 is installed in the user terminal, and set the distribution ratio for App1 to 4/10 according to the set ratio when App3 is installed in the user terminal.

Thereafter, if App3 is deleted, the reward distribution unit 204 can adjust the distribution ratio for App1 and App2 to 5:5 (10 in total), as shown in FIG. 12B, by adjusting the distribution ratio to the set ratio based on the number of installed applications.

Thereafter, if App4 is installed, the reward distribution unit 204 can adjust the distribution ratio for App1, App2 and App4 to 4:3:3 (10 in total), as shown in FIG. 12C, by adjusting the distribution ratio to the set ratio based on the number of installed applications.

The above-described distribution scheme of FIG. 12 is merely one example. It is obvious that the reward distribution unit 204 can adjust the distribution ratio to the set ratio based on information on download rank or popularity rank of an application provided by the App store server 300, or alternatively, may employ other different schemes. It is also obvious that a variety of schemes may be applied to the distribution ratio adjustment for application deletion and addition.

Figure 13:
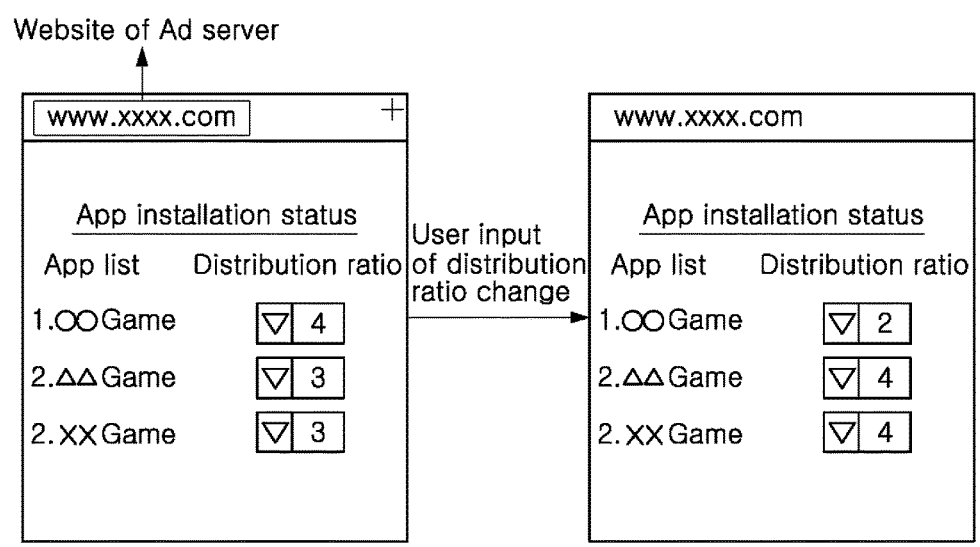
FIG. 13 is a configuration view showing reward distribution setup, according to a user input, of an Ad system using an in-App Ad module according to an embodiment of the present invention.

In addition, as shown in FIG. 13, the Ad server 200 can provide a Web site for reward distribution setting and the reward distribution unit 204 can receive a user input from the user terminal 10 accessed the Web site and adjust the distribution ratio of the applications installed in the user terminal 10 according to the user input. In addition, the reward distribution unit 204 can store the distribution ratio adjusted according to the user input, as reward distribution setting information 223, in the member DB 200 in association with membership information of the user terminal. In this case, as a matter of course, the distribution ratio may be adjusted so that the saved rewards are assigned only for one application.

As a result, rewards can be intensively assigned for an application desired by a user.

The point registration unit 206 can transmit a reward assigned for each application in which an Ad module is inserted, according to the distribution ratio, to an application-related server 400 related to each application and, then, a user can use the reward to purchase items or goods provided by the application-related server 400 through the applications installed in the user terminal.

In this case, since values of rewards for points used to purchase the items or goods for each application in which the Ad module 100 is inserted may be different, the Ad server 200 according to the present invention may further include the reward exchange unit 205 for supporting exchange of the rewards for points for each application. In this case, the points may include electronic money unit supported by each application. As one example, the points may include a variety of names such as point, gold and so on.

The Ad DB 210 may store application exchange information 211. The App exchange information 211 may include point-related information used to purchase the items or goods for each application, and information on exchange rates between the rewards and the points.

Accordingly, the reward exchange unit 205 can exchange the rewards assigned for each application for points supported by each application and transmit the points to the point registration unit 206. The point registration unit 206 can transmit the points to the App-related server 400 for saving.

Figure 14:
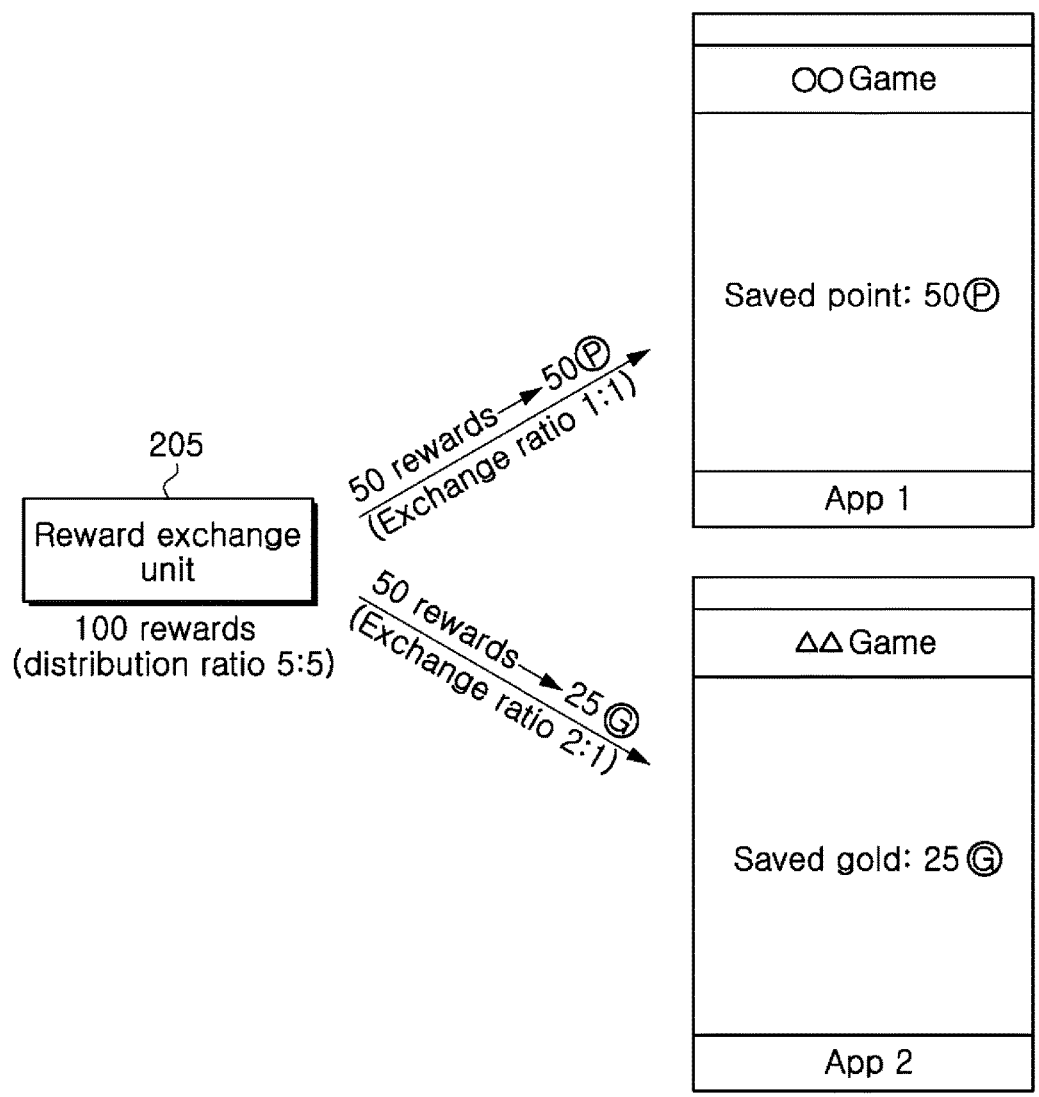
FIG. 14 is an operation configuration view showing application reward exchange of an Ad system using an in-App Ad module according to an embodiment of the present invention.

As one example of an operation configuration for the above-described reward exchange unit 205, as shown in FIG. 14, if saved rewards "100" are distributed at a ratio of 5:5 for App1 and App2, the reward exchange unit 205 and if a value (exchange rate) of point vs. reward in App1 is 1:1, the reward exchange unit 205 can exchange assigned "50 rewards for "50" points which is the point unit supported by the application. In addition, if a value of point vs. reward in App2 is 1:2, the reward exchange unit 205 can exchange assigned "50 rewards for "25" points (in the shown example, App2 sets points to gold).

In this manner, the reward exchange unit 205 can exchange rewards for points according to an exchange rate for each application and transmit the points to the point registration unit 205, and the point registration unit 206 can transmit and register the points to the App-related server 400 corresponding to each application. Accordingly, a user can use saved rewards in a plurality of applications.

Through the above-described configuration, while proceeding with an advertisement through a variety of applications in agreement with the subject of the Ad server, an advertiser can insert and distribute the Ad module in his/her application and, thereafter, if preference of the corresponding application becomes high, intensively save rewards generated by users in the corresponding application, thereby allowing recovery of costs due to Ad expenditure in terms of rewards, which can result in saving of high Ad costs.

In the meantime, if each Ad module 100 is installed in parallel to each application, with no integration, in the user terminal according to the configuration of FIG. 7, the Ad server 200 can identify the Ad module 100 transmitting the ID information as the Ad module 100 activated in the user terminal and also save rewards in an application corresponding to the activated Ad module.

Accordingly, the Ad server 200 can identify the latest-executed application and save rewards in the corresponding application.

Even in the case of an integrated Ad module, ID information of the latest-executed application in interlocking with each application can be transmitted to the Ad server, thereby allowing rewards to be saved in the latest-executed application.

Accordingly, rewards can be consistently saved in a particular application through the consistent execution of the particular application.

That is, if a user intends to consistently save rewards only in a desired application, only the desired application can be consistently executed to allow the rewards to be intensively saved in only one application.

On the other hand, the configuration of the reward distribution unit 204 of the Ad server 200 may be included in the reward processing unit 160 of the Ad module 100, and an application in which the Ad module 100 is inserted may interlock with the Ad module 100 installed in parallel in the user terminal and select activation or deactivation for the Ad module 100.

According to the configuration as described above, the Ad module 100 can save the generated rewards, distribute the saved rewards for each application according to a status of an application installed in the user terminal 10, and transmit the distributed rewards to the Ad server 200. The Ad server 200 can transmit the rewards distributed for each application to the application-related server 400 corresponding to each application so that a user can use the corresponding rewards in an application.

In particular, the Ad module 100 can detect whether or not the application is executed, give a high weight to the latest-executed application, and adjust a distribution ratio according to the weight.

Accordingly, the Ad module 100 can save the generated rewards and intensively allocate the saved rewards to the latest-executed application.

In this case, it is obvious that the Ad module 100 can receive setup information on a reward distribution for each application from the Ad server 200 or through a user input, and adjust a distribution ratio based on the received setup information.

In addition, each application installed in the user terminal 10 can select activation or deactivation of the Ad module 100. The Ad module 100 can receive selection information on activation or deactivation of each application and transmit application ID information corresponding to an application activated based on the selection information to the Ad server 200. Then, the Ad server 200 can operate to transmit Ad information related to an application corresponding to the received application ID information to the Ad module and provide only Ad information on an application desired by a user.

Figure 15:
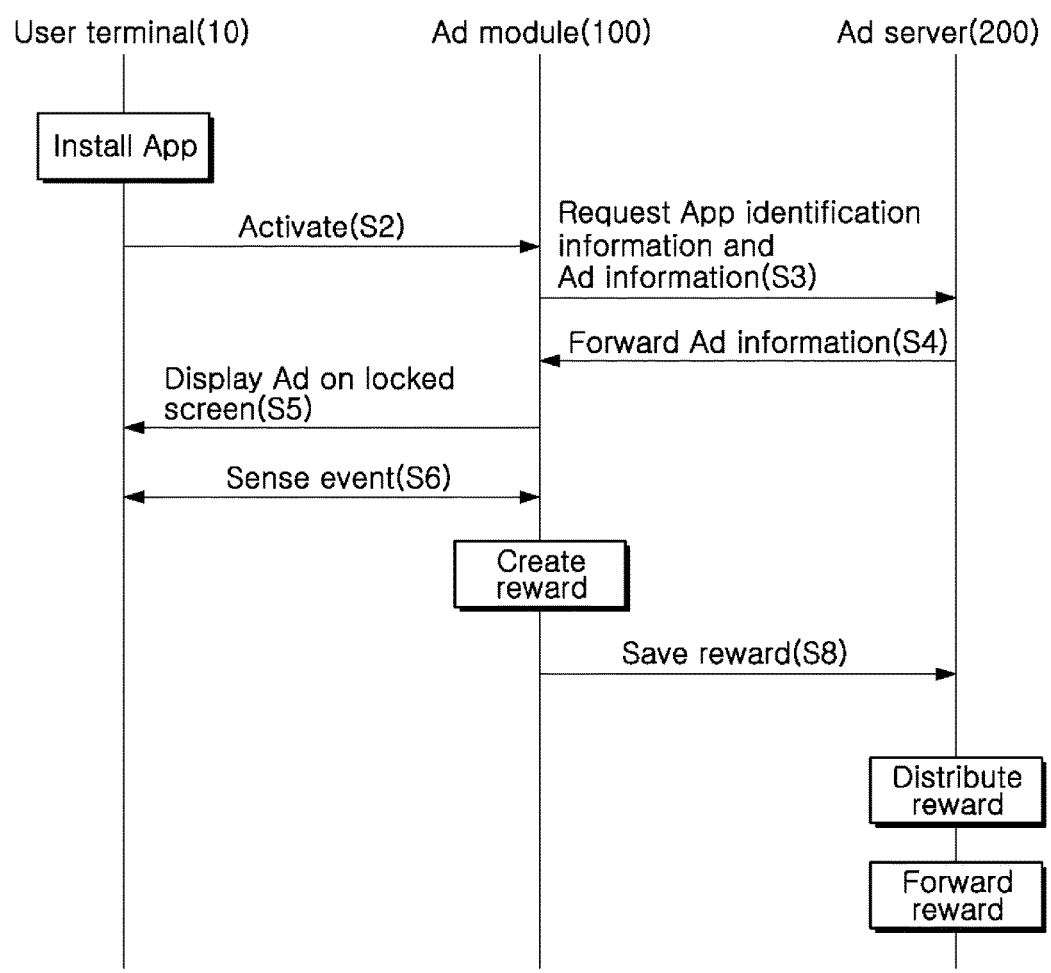
FIG. 15 is a sequence diagram showing an advertising method of an Ad system using an in-App Ad module according to an embodiment of the present invention.

FIG. 15 is a sequence diagram showing an advertising method of an Ad system using an Ad module included in the above-described application. As shown, when an application in which an Ad module is inserted is installed in the user terminal (S1), the Ad module can be automatically activated (S2) or activated according to a user input for activation of the Ad module.

The activated Ad module 100 can transmit application ID information and a signal for Ad information request to the Ad server 200 (S3) and the Ad server 200 can transmit the Ad information to the Ad module 100 (S4).

The Ad module 100 can display the Ad information received from the Ad server 200 on the lock screen of the user terminal 10 (S5), detect event information generated according to the user input (S6), compare the event information with reward generation conditions set in association with the Ad information, and, if both match with each other, generate rewards (S7).

The Ad module 100 can transmit and save the generated rewards to the Ad server 200 (S8). The Ad server 200 can distribute the generated rewards for each application according to a user input or a preset distribution ratio depending on an installation status of an application installed in the user terminal through the application ID information (S9).

Thereafter, the Ad module 100 can transmit the distributed rewards to an application-related server corresponding to each application (S10) so that a user can use the rewards to purchase items or goods provided by each application.

While the present invention has been particularly shown and described with reference to exemplary embodiments thereof, it will be understood by those skilled in the at that various changes in form and details may be made therein without departing from the spirit and scope of the present invention. The exemplary embodiments are provided for the purpose of illustrating the invention, not in a limitative sense. Thus, it is intended that the present invention covers the modifications and variations of this invention provided they come within the scope of the appended claims and their equivalents.

What is claimed is:

1. A computer-implemented advertising (Ad) system using an in-App advertisement module for displaying advertisements provided by an Ad server on a lock screen of a mobile device, comprising:

one or more processors including one or more applications installed in a computer-readable medium of the mobile device;

one or more processors including an Ad module which is inserted in each application, is installed in parallel to each application without being integrated with the application, and is configured to display externally-received Ad information on the lock screen, detect, by the processors, event information generated according to a user input through the mobile device having a display, generate, by the processors, rewards if the detected event information satisfies reward generation conditions set in association with the Ad information, and transmit the generated rewards to the Ad server; and the Ad server, using server computer-readable medium, configured to provide the Ad information for the Ad module, save the rewards received from the Ad module in association with the mobile device and transmit the saved rewards so that the saved rewards can be used in at least one of the applications, wherein the rewards generation conditions are differently set depending on the Ad information, wherein the Ad module displays the Ad information on the lock screen without displaying the Ad information on an execution screen of the at least one of the applications, wherein the Ad module is configured to provide a user interface which receives user input through the mobile device to selectively activate the Ad module that saves the rewards for the application installed in parallel with the Ad module, wherein the user interface is provided through the application installed in parallel with the Ad module.

2. The computer-implemented Ad system according to claim 1, wherein the reward generation conditions include event information set for at least one selected from a group consisting of lock state release, input to a user interface inserted in the Ad information, access to an address linked to the Ad information through the use input, and installation of an application corresponding to the Ad information through the user input.

3. The computer-implemented Ad system according to claim 1, wherein, if a plurality of applications, which use the processors and in which the Ad modules are inserted, is installed in the mobile device, the Ad modules, wherein identification (ID) information of each application is stored in the corresponding Ad module, are integrated into the first-installed Ad module and the first-installed Ad module adds or deletes the ID information of the application according to addition or deletion of the application.

4. The computer-implemented Ad system according to claim 1, wherein the Ad module transmits ID information of the latest-executed application in interlocking with execution of the application, and the Ad server transmits saved rewards so that the saved rewards can be used in the latest-executed application based on the ID information.

5. The computer-implemented Ad system according to claim 4, wherein the Ad module provides the ID information of the application for the Ad server and the Ad server provides Ad information based on the application ID information.

6. The computer-implemented Ad system according to claim 1, wherein the saved rewards are distributed and transmitted by the Ad server to each of the one or more applications according to a predetermined ratio.

7. The computer-implemented Ad system according to claim 6, wherein the predetermined ratio is variable and dependent on the number of installed applications.

8. The computer-implemented Ad system according to claim 6, the predetermined ratio is variable and dependent on user input received from the mobile device.

9. The computer-implemented Ad system according to claim 1, wherein the Ad server transmits the saved rewards to a server corresponding to each application and registers the saved rewards in the server so that the saved rewards can be used to purchase items or goods.

10. The computer-implemented Ad system according to claim 9, wherein the Ad server exchanges rewards assigned for each application for points according to an exchange rate set for each application and registers the points in the server corresponding to each application in association with user information of the mobile device.

11. The computer-implemented Ad system according to claim 1, wherein the one or more applications each comprises one or more items available for purchase by the user using the rewards.

12. The computer-implemented Ad system according to claim 1, wherein the Ad module displays multiple Ad information received from the Ad server on the lock screen at set intervals.

13. A computer-implemented advertising (Ad) method using an in-App advertisement module for providing Ads for a mobile device in communication of an Ad module with an Ad server the Ad module being inserted in one or more applications installed in the mobile device and being installed in parallel to each of the applications without being integrated with the application, comprising:

a first step where the Ad module requests, by one or more processors, the Ad server to provide Ad information;

a second step where the Ad module displays the Ad information received from the Ad server on a lock screen of the mobile device having a display;

a third step where the Ad module detects, by the processors, event information generated according to a user input through the mobile device and compares the event information with reward generation conditions set to correspond to the Ad information;

a fourth step where the Ad module generates, by the processors, rewards based on a result of the comparison of the third step and transmits the generated rewards to the Ad server; and a fifth step where the Ad server, using server computer-readable medium, saves the rewards received from the Ad module to correspond to the mobile device and transmits the saved rewards so that the saved rewards can be used in at least one of the applications, wherein the reward generation conditions are differently set according to the Ad information, wherein the Ad module displays the Ad information on the lock screen without displaying the Ad information on an execution screen of the at least one of the applications, wherein the Ad module is configured to provide a user interface which receives user input through the mobile device to selectively activate the Ad module that saves the rewards for the application installed in parallel with the Ad module, wherein the user interface is provided through the application installed in parallel with the Ad module.

14. The computer-implemented Ad method according to claim 13, wherein the reward generation conditions include event information set for at least one selected from a group consisting of lock state release, input to a user interface inserted in the Ad information, access to an address linked to the Ad information through the use input, and installation of an application corresponding to the Ad information through the user input.

15. The computer-implemented Ad method according to claim 13, wherein the first step includes: by the Ad module, transmitting stored identification (ID) information of each of the applications to the Ad server, and wherein the second step includes: receiving Ad information based on the ID information of each of the applications from the Ad server.

16. The computer-implemented Ad method according to claim 13, wherein the first step includes: by the Ad module, transmitting ID information of the latest-executed application to the Ad server, and wherein the fifth step includes: by the Ad server, transmitting the saved rewards so that the saved rewards can be used in an application corresponding to the ID information received from the Ad module.

17. The computer-implemented Ad method according to claim 13, wherein the fifth step includes: by the Ad server, distributing and transmitting the saved rewards at a ratio set for each of the applications so that the saved rewards can be used in each of the applications.

18. The computer-implemented Ad method according to claim 17, wherein the fifth step includes: by the Ad server, varying the set ratio according to the number of applications installed in the mobile device.

19. The computer-implemented Ad method according to claim 17, wherein the fifth step includes: by the Ad server, receiving a user input provided from the mobile device and varying the set ratio according to the received user input.

20. The computer-implemented Ad method according to claim 13, wherein the fifth step includes: by the Ad server, transmitting the saved rewards to a server corresponding to each of the applications and registering the saved rewards so that the saved rewards can be used to purchase items or goods.

21. The computer-implemented Ad method according to claim 20, wherein the fifth step includes: exchanging rewards assigned to each of the applications for points according to an exchange rate set for each of the applications and registering the points in association with user information of the mobile device corresponding to each of the applications.

22. The computer-implemented Ad system according to claim 3, wherein the Ad module provides the ID information of the application for the Ad server and the Ad server provides Ad information based on the application ID information.

* * * * *